Oct. 29, 1968  J. G. COULTRUP  3,407,611
METHOD OF CONSTRUCTING SUBMARINE PIPELINES
Filed March 27, 1967  2 Sheets-Sheet 1
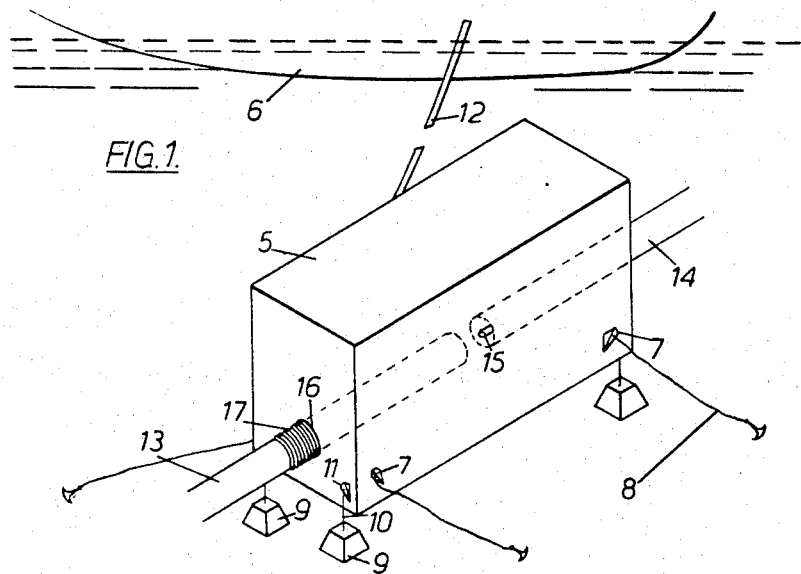
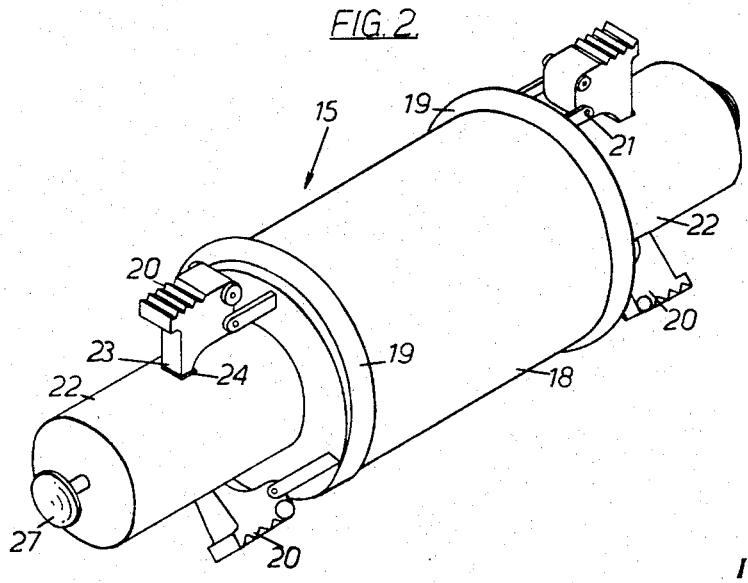
Inventor
J. G. COULTRUP
By
Holcombe, Wetherill & Brisebois
Attorneys Oct. 29, 1968    J. G. COULTRUP    3,407,611
METHOD OF CONSTRUCTING SUBMARINE PIPELINES
Filed March 27, 1967    2 Sheets-Sheet 2
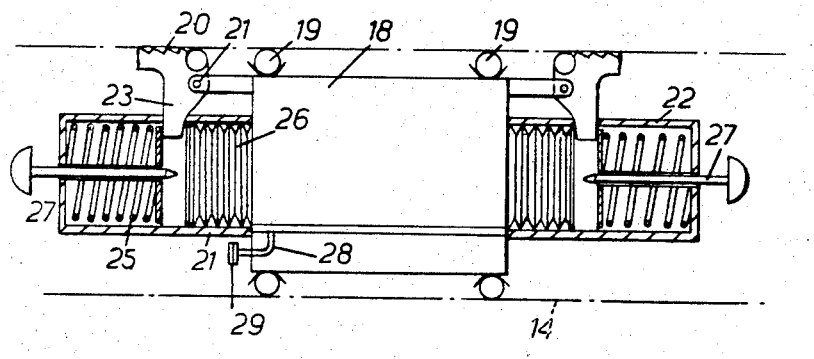
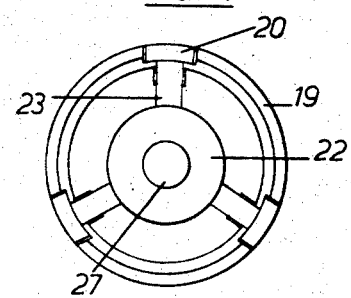
Inventor
J. G. COULTRUP
By
Holcombe, Wetherill & Brisebois
Attorneys United States Patent Office 3,407,611
Patented Oct. 29, 1968

3,407,611
METHOD OF CONSTRUCTING
SUBMARINE PIPELINES
James G. Coultrup, 7298 Avenida Milagro,
Maracaibo, Venezuela
Filed Mar. 27, 1967, Ser. No. 626,163
7 Claims. (Cl. 61—72.3)

ABSTRACT OF THE DISCLOSURE

The invention is concerned with under sea pipelines which are made up from sections of pipe. The individual pipe sections are plugged at each end, towed out and laid on the sea bed and then welded together end to end in a submerged chamber containing inert gas. The plugs are then automatically released by application of fluid pressure to one end of the completed pipeline and are blown out of the other end of the pipeline.

---

One way of laying a long submarine pipeline is to construct on shore lengths of the pipe which are then tested and sometimes given protective coatings. Buoys are attached at intervals along the length of the pipe and the pipes are towed out to sea and lowered to the sea bed by cutting off the buoys. Difficulties arise in joining the adjacent lengths of pipe at sea particularly when the pipes have a diameter in excess of 12 inches and when they are laid in up to 600 feet of water. In one method the adjacent ends are raised up above the water and the ends are welded together on a floating platform or ship. This has the obvious disadvantage that the pipes are subjected to considerable bending and stress where they curve up through a point of contraflexure from the sea bed to the platform or ship and when the joined ends are lowered again they do not lie in a straight line along the sea bed because of the extra length of pipe needed to extend up through the water to where the joint was made. Attempts to make the joint on the sea bed have involved mechanical joints using some sort of packing. In most pipelines anything less than a welded joint is unacceptable.

In accordance with the present invention I construct a submarine pipeline by preparing lengths of pipe on shore, sealing the ends of the lengths of pipe with plugs, towing the lengths of pipe out to sea and positioning them end to end on the sea bed, sealing the adjacent ends of each adjacent pair of pipe lengths in turn in a surrounding chamber containing inert gas at superatmospheric pressure sufficient to support the hydrostatic pressure of the water, welding the ends of the lengths of pipe together within the chamber and, after making the other joints in a similar fashion forcing the plugs out through one end of the pipe-line by the application of fluid pressure to the other end of the pipeline.

Many advantages follow from the use of this method. The individual lengths of pipes can be pumped up with air, between the plugs, on shore for testing and the air in the pipes will give them a certain buoyancy when being maneuvered into axial alignment with one another prior to the making of the joint. This is particularly important when the pipes are sheathed in heavy concrete. The alignment may be carried out by operators working in the chamber or by means of cables suspended from a ship or rig above water level. The pipes remain dry since the plugs are not removed until the pipeline has been completed so that water corrosion is minimised. The air in the pipes is preferably at a pressure greater than that necessary to withstand the hydrostatic pressure at the depth at which the pipes are to be laid so that in the event of a very small leak past one of the plugs, water does not enter the pipe.

The weld, particularly an arc weld, can be carried out by operators wearing closed circuit breathing apparatus in an inert atmosphere which is not harmful to the weld and without danger of fire risk. The inert gas may be nitrogen but is preferably carbon dioxide, argon, or helium, and the partial pressure of oxygen should be less than 5 p.s.i. and preferably less than 3 p.s.i.

Since the plugs seal the interior of the pipes from the chamber while the joint is made, expensive inert gas does not have to be used to fill the pipes and is not lost from the chamber into the pipes. Furthermore, the plugs prevent gas flow between the chamber and pipe which might otherwise inhibit the placing of the weld material.

The chamber may be simply an open bottomed chamber which is lowered and anchored on or adjacent to the sea bed after which the inert gas is pumped into the chamber to displace the water from the chamber. The pipe ends will extend through the walls of the chamber and be sealed to them, and the walls or the seal must be flexible enough to enable the ends of the pipes to be manipulated accurately into alignment with one another.

The pipe lengths can thus be joined in a straight line on the sea bed without any undue stressing with an arc welded joint, the most desirable type of joint.

The construction of the plugs is of particular importance and in accordance with a further feature of the invention, each plug comprises a body having a peripheral sealing ring which is arranged to seal against the inner wall of a pipe, and an expanding ring of grippers which are arranged to grip the inner wall of the pipe until positively released by the application of force on an end of the plug. The ring of grippers is necessary because although the sealing ring may tightly engage the wall of the pipe, its frictional engagement with the pipe might not be sufficient to prevent movement of the plug along the pipe when the plug is subjected to diffeertnial pressures across its ends.

Although the ring of grippers may be arranged to be released by fluid pressure on an end of the plug, it is preferably arranged to be released by a mechanical force derived from a pig or another plug driven along the pipeline and butting into it. When plugs of this form are used, before the plugs are driven out of the completed pipeline, it is necessary to establish fluid flow right through the pipeline. For this purpose the plug will include a rupturable diaphragm which supports the pressure across the plug during the laying and jointing of the pipes but which is ruptured and allows fluid to flow past to plug upon the application of a higher fluid pressure on one end of the plug. In use, when all the joints are made, the fluid will first be forced along the pipeline at a pressure sufficient to rupture the diaphragms of all the plugs and establish a fluid circuit right through the pipeline. A piston like pig will then be forced by fluid pressure along the pipeline from one end and will mehcanically release the ring of grippers of the first plug before pushing this plug in front of it along the pipeline. When the first plug hits the second plug it will mechanically disengage the gripper ring of the second plug and the second plug will be carried along as well. In this way all the plugs will be released in turn and forced out of the far end of the pipeline in front of the pig.

One example of the construction of a pipeline in accordance with the present invention is illustrated in the accompanying drawings, in which:

FIGURE 1 is a perspective view showing the making of a connection between lengths of pipe on the sea bed;

FIGURE 2 is a perspective view of one of the plugs used to seal the end of a length of pipe;

FIGURE 3 is a longitudinal axial section through one of the plugs; and,

FIGURE 4 is an end elevation of one of the plugs.

As shown in FIGURE 1, an opened bottomed rectangular chamber 5 is shown having been lowered to the sea bed from a boat 6 on cables attached to brackets 7 at the corners of the chamber. After lowering the lowering cables are disconnected from the brackets 7 and anchor lines 8 are attached in their place to control lateral movement of the chamber. The chamber 5 is carried to the bottom of the sea, and held there, by a number of weights 9 which are secured by cables 10 to further brackets 11 on the end walls of the chamber. A utility line 12, carrying electric cables and gas conduits interconnects the chamber 5 and boat 6. After the chamber 5 is lowered to the sea bed, the anchor cables 8 are secured to it and other work is carried out around and within the chamber by men wearing diving equipment.

Each chamber 5 is used to connect together two lengths of pipe 13 and 14 the ends of which are sealed with plugs 15 and which are towed out and laid on the sea bed end to end in approximately their required position to form the pipe line. The pipe lengths will, before towing out, be pumped up to say 100 p.s.i. if they are to be laid in 200 feet of water. The ends of the length of pipe 13 and 14 are manipulated through holes 16 in the end walls of the chamber and flexible seals 17 are fitted to the apertures 16 to seal the apertures whilst allowing the ends of the lengths of pipe to be manipulated into exact alignment with one another within the chamber.

When this stage has been reached the chamber 5 is pumped up with an inert gas which displaces water in the chamber 5 downwards out of the open bottom of the chamber. The ends of the two lengths of pipe 13 and 14 are then welded together using electrical energy supplied through utility line 12. The chamber 5 may be disposable and be allowed to remain on the sea bed, in readiness perhaps for subsequent maintenance at the joint, or it may be disengaged from the pipe line and recovered for use again.

A plug 15 is illustrated more clearly in FIGURES 2 to 4. The plug has a cylindrical body 18 supporting around its periphery at each end an O-sealing ring 19 for sealing against the inner surface of a pipe. At each end the body supports a ring of three equiangularly spaced pivoted grippers 20, the pivots 21 of which ensure that any movement of the plug in an axial direction causes the grippers 20 at one end of the plug or the other to wedge even more tightly in the pipe. A tubular housing 22 extends right through and coaxially out of both ends of the body 18 and each gripper 20 has a leg 23 which extends radially inwards through a slot 24 in the housing 22. Within the housing the legs 23 of each ring of three grippers 20 are urged towards the body of the plug by a helically coiled compression spring 25 in a direction to rock the grippers 20 out of engagement with a pipe wall. A bellows 26, formed by concertina ends on a common tube, extends through the body 18 of the plug within the housing 22 and each end of the bellows engages the legs 23 of the adjacent ring of grippers 20. When the bellows 26 are extended by internal pressure, they hold the legs 23 against the action of the springs 25 in a position in the grippers 20 are in the radially outwardly extending gripping positions. A plunger pin slides coaxially through each end of the housing 22 and has its pointed end immediately adjacent to an end of the bellows 26.

The annular space formed within the cylindrical body 18 around the housing 22 is sealed by an annular wall and a small duct 28 leads through the seal and out of the side of the body 18 at each end of the plug. At one end the duct 28 terminates in a disc 29 which will rupture when subjected to a differential pressure of 250 p.s.i. This disc 29 is able to support the differential pressure across the plug during laying and jointing of the lengths of pipe.

When the welded joints between all the length of pipe in the pipeline have been made so that the pipeline is complete, fluid pressure above 250 p.s.i. is applied to one end so that the discs 29 in the plugs 15 are ruptured and a fluid flow path is established right through the pipeline. A cylindrical pig is then forced along the pipeline from one end. When the pig or the preceding plug reaches a particular plug, it engages the head on the plunger 27 at the corresponding end of the plug and forces the plunger inwards so that the adjacent end of the bellows 26 is torn and the gripper rings 20 at both ends of the plug are positively released by the action of the springs 25. That plug is then free to be carried along the pipe line in front of the pig which forces all the plugs in front of it out of the pipeline which may be 10 to 10 miles or more long.

I claim:
1. A method of constructing a submarine pipeline, said method comprising the steps of preparing lengths of pipe on shore, sealing the ends of said lengths of pipe with plugs, towing said lengths of pipe out to sea and positioning them end to end on the sea bed, sealing the adjacent ends of each adjacent pair of said pipe lengths in turn in a surrounding chamber containing inert gas at superatmospheric pressures sufficient to support the hydrostatic pressure of the water, welding said ends of said lengths of pipe together within said chamber and, after making the other joints in a similar fashion, forcing said plugs out through one end of said pipeline by the application of fluid pressure to the other end of said pipeline.

2. A method according to claim 1, wherein said plugged lengths of pipes are filled with air at a pressure greater than that necessary to withstand the hydrostatic pressure at the depth at which said pipeline is to be laid.

3. A method according to claim 1, wherein said chamber is open bottomed and is lowered and anchored on or adjacent to said sea bed after which said inert gas is pumped into said chamber to displace the water from said chamber.

4. A method according to claim 1, wherein each of said plugs comprises a body, a peripheral sealing ring mounted on said body and adapted to seal against the inner wall of one of said lengths of pipe, and an expanding ring of grippers adapted to grip the inner wall of said pipe length until positively released by the application of force to one end of said plug.

5. A method according to claim 4, wherein said ring of grippers are held in their gripping position against the action of the spring by gas filled bellows, and there is a pin which is arranged to be moved to rupture said bellows when a force is applied to an end of said plug.

6. A method according to claim 5, wherein said plug has two similar axial ends, each of said ends being provided with a separate ring of grippers, a spring, and a pin for rupturing the adjacent end of the common bellows.

7. A method according to claim 4, wherein each of said plugs includes a rupturable diaphragm which is adapted to support the differential pressure across said plug during laying and jointing of said pipe lengths but which, together with said diaphragms of said other plugs in said pipeline is ruptured to provide a fluid circuit through said pipeline upon application of high fluid pressure to one end of said pipeline after said jointing has been completed but before said plugs are driven out of said pipeline.

References Cited

UNITED STATES PATENTS

| | | | |
|---|---|---|---|
| 1,839,322 | 1/1932 | Lawrence | 61—72.3 |
| 2,667,751 | 2/1954 | Osborn | 61—69 |
| 2,877,628 | 3/1959 | Maunsell | 61—72.3 X |
| 3,106,069 | 10/1963 | Risley et al. | 61—72.3 X |
| 3,136,133 | 6/1964 | Perret | 61—72.3 |

EARL J. WITMER, *Primary Examiner.*